(12) United States Patent
Kim

(10) Patent No.: US 7,773,420 B2
(45) Date of Patent: Aug. 10, 2010

(54) MEMORY CARD SYSTEM INCLUDING NAND FLASH MEMORY AND SRAM/NOR FLASH MEMORY, AND DATA STORAGE METHOD THEREOF

(75) Inventor: Gwang-Myung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 721 days.

(21) Appl. No.: 11/696,991

(22) Filed: Apr. 5, 2007

(65) Prior Publication Data

US 2008/0133824 A1    Jun. 5, 2008

(30) Foreign Application Priority Data

Dec. 4, 2006    (KR)    ................ 10-2006-0121658

(51) Int. Cl.
*G11C 11/34*    (2006.01)
(52) U.S. Cl. ............... 365/185.08; 365/51; 365/52; 711/103; 711/104
(58) Field of Classification Search ............ 365/185.08, 365/51, 52; 711/103, 104, 202
See application file for complete search history.

(56) References Cited

U.S. PATENT DOCUMENTS

| | | | |
|---|---|---|---|
| 5,404,485 A | 4/1995 | Ban | |
| 5,422,856 A | 6/1995 | Sasaki et al. | |
| 5,937,425 A | 8/1999 | Ban | |
| 5,937,485 A | 8/1999 | Dittmer | |
| 6,381,176 B1 | 4/2002 | Kim et al. | |
| 6,765,812 B2 * | 7/2004 | Anderson | ............ 365/51 |
| 6,882,568 B2 * | 4/2005 | Shiota et al. | ......... 365/185.08 |
| 7,353,324 B2 * | 4/2008 | Tanaka | ............ 711/103 |
| 7,412,560 B2 * | 8/2008 | Smith et al. | ............ 711/103 |

FOREIGN PATENT DOCUMENTS

| | | |
|---|---|---|
| JP | 07-078231 | 3/1995 |
| JP | 7-325898 A | 12/1995 |
| JP | 08-087876 | 4/1996 |
| JP | 2005-267628 A | 9/2005 |
| JP | 2006-65533 A | 3/2009 |
| KR | 10-1995-0004059 A | 2/1995 |
| KR | 10-2005-0067784 A | 7/2005 |

* cited by examiner

*Primary Examiner*—Son Dinh
*Assistant Examiner*—Toan Le
(74) *Attorney, Agent, or Firm*—Myers Bigel Sibley & Sajovec

(57) ABSTRACT

An integrated circuit memory system includes a random access memory device, a flash memory device and a memory controller, which may be embodied on a single integrated circuit substrate. The memory controller is configured to respond to at least one command to write data into the flash memory device by first writing the data into the random access memory device and then transferring the data from the random access memory device to the flash memory device. The random access memory device may be a NOR-type flash memory device and the flash memory device may be a NAND-type flash memory device.

19 Claims, 6 Drawing Sheets

MEMORY CARD SYSTEM INCLUDING NAND FLASH MEMORY AND SRAM/NOR FLASH MEMORY, AND DATA STORAGE METHOD THEREOF

CROSS-REFERENCE TO RELATED APPLICATION

This application claims priority from Korean Patent Application No. 2006-121658, filed Dec. 4, 2006, the disclosure of which is hereby incorporated herein by reference in its entirety.

FIELD OF THE INVENTION

The present invention relates to memory card systems and, more particularly, to memory card systems having SRAM/NOR flash memories therein.

BACKGROUND OF THE INVENTION

Portable digital devices such as digital cameras, MP3 players, color mobile phones, personal data assistants (PDAs), etc., typically utilize memory cards (i.e., MultiMedia cards, Secure Digital (SD) cards) to store data. These memory cards typically have non-volatile storage characteristics.

In general, a memory card system may include a host and a memory card. The memory card includes a memory controller and a memory core. The memory controller manages an overall operation for interfacing with the host and the memory core. The memory core usually employs a NAND flash memory. NAND flash memory devices can be classified into types: single-level cell (SLC) devices and multi-level cell (MLC) devices.

Bad blocks with data storage errors may be generated when writing data into the NAND flash memory, due to variations in processing conditions, voltage levels of selected word lines, operation voltages, and temperature. A memory card replaces a bad block with a usable block that is assigned to a predetermined region of the NAND flash memory, by means of a flash translation layer (FTL) included in the memory controller. This management of bad block is carried out through an address mapping process by the memory controller.

The address mapping is conducted by an FTL, which is stored in the memory controller. The FTL functions to map a logical address, which is generated from the host during a writing operation, into a physical address of the flash memory that has been erased. The FTL may be formed of software or hardware in the pattern of firmware. Examples of address mapping carried out by FTL are disclosed in U.S. Pat. No. 5,404,485 entitled "FLASH FILE SYSTEM", U.S. Pat. No. 5,937,485 entitled "FLASH FILE SYSTEM OPTIMIZED FOR PAGE-MODE FLASH TECHNOLOGIES", and U.S. Pat. No. 6,381,176 entitled "METHOD OF DRIVING REMAPPING IN FLASH MEMORY AND FLASH MEMORY ARCHITECTURE SUITABLE THEREOF." This address mapping information is stored in a hidden area of the NAND flash memory as metadata. As an address mapping operation is carried out whenever data is written in the NAND flash memory, such metadata is updated and stored in the NAND flash memory every data input.

The memory card may store updated metadata and host input data into the NAND flash memory whenever data is input from the host. Generally, the NAND flash memory is longer than an SRAM or NOR flash memory in terms of data storage time. In storing data into the memory card, the host sends the memory card a single-block-write command if the data to be transferred is 512 bytes or a multiple-block-write command if the data to be transferred is a plurality of 512 bytes. If the memory card includes an MLC NAND flash memory and receives the single-block-write command from the host, the memory card stores 512-byte data, which is input from the host, into a page of the MLC NAND flash memory that is designated with an address by the host. If the host continues to transfer the single-block-write command, the host designates successive addresses and transfers the 512-byte data until the assigned page of the MLC NAND flash memory is full of data. If a unit page of an MLC NAND flash memory has data capacity of 2 K bytes, the host transfers 512-byte data four times. But, because a unit page of the MLC NAND flash memory is limited as being available for one-time writing, 512-byte data input from the host is stored in another page different from the page storing the previous 512-byte data. Thus, the host stores four groups of 512-byte data in four individual pages, respectively, of the MLC NAND flash memory in substance.

The 512-bytes of data each stored in the four pages of the MLC NAND flash memory by the memory controller are all stored in a single page of the MLC NAND flash memory. After then, the memory controller erases the 512-byte data stored in the four pages, arranging the data input from the host. Therefore, the memory card typically must execute a complicated procedure of operation for storing data into the MLC NAND flash memory when the host conducts the single-block-write command. Thus, the memory card storing data in the MLC NAND memory operates with a longer data storage time. As a result, the memory card may have a long data storage time as a whole because metadata is updated and stored in the NAND flash memory-every time data is input from the host. Further, including the MLC NAND flash memory, the memory card has a longer data storage time because of the necessity of conducting a complicated procedure of operation for storing data into the MLC NAND flash memory from the host. Such an extension of the whole data storage time causes degradation of operational performance in the memory card.

SUMMARY OF THE INVENTION

A memory card according to some embodiments of the present invention includes a random access memory, a flash memory storing system and user data, and a memory controller operating to control the random access memory and the flash memory. The memory controller is configured to read the system data from the flash memory, and updates and stores the system data in the random access memory in response to each input of user data to be stored in the flash memory.

A memory card according to additional embodiments of the present invention includes a random access memory, a multi-level cell flash memory storing user data, and a memory controller operating to control the random access memory and the multi-level cell flash memory. In these embodiments, the memory controller continuously inputs a series of single-block-write commands and user data, stores the user data into the random access memory in response each to the single-block-write commands, and then stores the user data into the multi-level cell flash memory from the random access memory if there is no more single-block-write commands. In particular, the memory controller stores the user data into the multi-level cell flash memory from the random access memory if a sum of the user data stored in the random access memory corresponds to one page capacity of the multi-level cell flash memory.

Additional embodiments of the invention include methods of storing system data in a memory card including flash and random access memories. The method includes the steps of updating the system data in response to each input of the user data to be stored in the flash memory, storing the updated system data into the random access memory, inputting a stop command from external if the input of the user data is terminated, and storing the system data into the flash memory from the random access memory in response to the stop command. The step of updating the system data may include reading the system data from the random access memory in response to the input of the user data, and updating the read system data.

Still further embodiments of the invention include methods of storing user data in a memory card including a multi-level cell NAND flash memory and a random access memory. These methods include the steps of continuously inputting a series of single-block-write commands and the user data from external, storing the user data each into the random access memory in response each to the single-block-write commands, and storing the user data into the multilevel cell NAND flash memory from the random access memory if there is no more input of the single-block-write command.

DETAILED DESCRIPTION OF PREFERRED EMBODIMENTS

Figure 1:
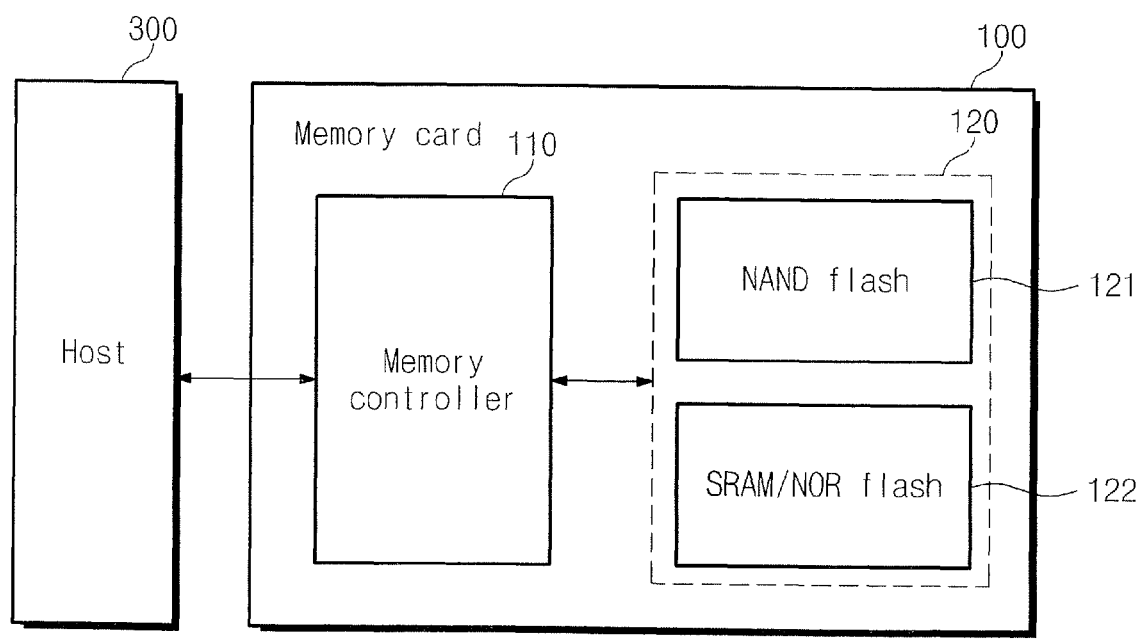
FIG. 1 is a block diagram of a memory card system according to an embodiment of the present invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

A memory card according to an embodiment of the present invention includes a memory controller, a NAND flash memory, and a SRAM/NOR flash memory. System data generated from the memory controller and data (hereinafter referred to as "user data") transferred from a host are temporarily stored in the SRAM/NOR flash memory. The user data stored in the SRAM/NOR flash memory is then transferred to the NAND flash memory. This way of transferring data is helpful at reducing a data storage time as a whole. The memory card according to the present invention is improved by enhancing an operation speed in storing data.

FIG. 1 is a block diagram of a memory card system according to an embodiment of the present invention. Referring to FIG. 1, the memory card 100 according to an embodiment of the present invention is comprised of a memory controller 110 and a memory core 120. The memory controller 110 operates to control an overall function of the memory card 100. For instance, the memory controller 110 conducts programming, erasing, or reading operations requested from a host 300 (i.e., programming the memory core 120 with data input from the host 300, erasing data stored in the memory core 120, or transferring data to the host 300 from the memory core 120). The memory core 120 stores user data transferred from the host 300 and metadata generated from the memory controller 110, under control of the memory controller 110. The metadata may be substantially the same as system data.

The memory core 120 includes a NAND flash memory 121 and a SRAM/NOR flash memory 122. Generally, the SRAM/NOR flash memory 122 is faster then the NAND flash memory 121 in data storage speed. The SRAM/NOR flash memory 122 is a type of random access memory (RAM). The NAND flash memory 120 may be divided into single-level cell (SLC) and multi-level cell (MLC) memory elements. The NAND flash memory 121 includes pluralities of memory blocks (not shown). The NAND flash memory 121 includes a hidden area (not shown). The hidden area stores information unidentified to a user (e.g., system data such as address mapping information). The system data stored in the hidden area of the NAND flash memory 121 is information about bad blocks arising from a procedure of processing, or systemic information updated while storing data input from the host 300. Bad blocks, which may be generated from a manufacturing process, are preliminarily checked when generating system data for managing the identified bad blocks. The system data is stored in the NAND flash memory 121. If the bad blocks maybe arising from the process have not been checked, the memory controller 110 scans memory blocks of the NAND flash memory 121 at the beginning of operation and stores a result of the scanning into the NAND flash memory 121. The result of scanning the NAND flash memory is first system data, which is information for checking bad blocks and replacing the bad blocks with available blocks (not shown).

The host 300 transfers the user data, logical addresses, and a write command to the memory card 100 to support storing of data into the memory card 100. The memory controller 110 of the memory card 100 stores the user data in pages of the NAND flash memory 121, corresponding to the logical addresses input thereto, in response to the write command. The host 300 transfers the logical addresses to the memory card 100 so as to designate pages to store the user data. But, when bad blocks are generated or storing user data, physical addresses of pages of the NAND flash memory 121, in which data is stored, are different from logical addresses designated by the host 300. The logical addresses are converted into the physical addresses through an address mapping operation. Information of the address mapping is system data of the memory card 100.

The memory controller 110 stores a FTL (not shown) internally and conducts an address mapping operation when storing user data into the NAND flash memory 121. Through the address mapping operation with the FTL, system data is regenerated. This system data is new system data generated when storing user data into the NAND flash memory 121 from the host 300. Thus, the memory controller 110 updates the system data to include new system data generated whenever storing user data into the NAND flash memory 121 from the host 300. The memory controller 110 temporarily stores the updated system data into the SRAM/NOR flash memory 122 that is faster than the NAND flash memory 121 in storing data. Thereafter, if there is no input of user data from the host 300, the memory card 100 transfers the system data into the NAND flash memory 121 from the SRAM/NOR flash memory 122 without updating the system data. Thus, it is possible to shorten a time for storing the system data in the memory card 100.

If the host 300 stores user data in the memory card 100, a single-block-write command or a multiple-block-write command is transferred to the memory card 100. The single-block-write command is provided to transfer and store 512-byte data while the multiple-block-write command is provided to store pluralities of 512-byte data in the NAND flash memory 121. If the NAND flash memory 121 is an MLC type and the memory card 100 continuously inputs a stream of the single-block-write command from the host 300, the memory controller 110 of the memory card 100 temporarily stores user data from the host 300 into the SRAM/NOR flash memory 122 that is faster than the NAND flash memory 121 in data storage speed.

When the user data temporarily stored in the SRAM/NOR flash memory 122 corresponds to the capacity of one page, then the memory controller 110 stores the data into a page of the MLC NAND flash memory 121. However, even when the user data temporarily stored in the SRAM/NOR flash memory 122 is insufficient to correspond to the capacity of one page, the memory controller 110 will store the user data into a page of the MLC NAND flash memory 121 if there is no more data input with the single-block-write command. Thus, the memory card 100 may be able to shorten a time for storing data. Thus, the memory card 100 according to an embodiment of the present invention includes the SRAM/NOR flash memory 122, which contributes to reducing the whole data storage time. The shortened time for storing data as a whole enhances the performance of the memory card 100.

Figure 2A:
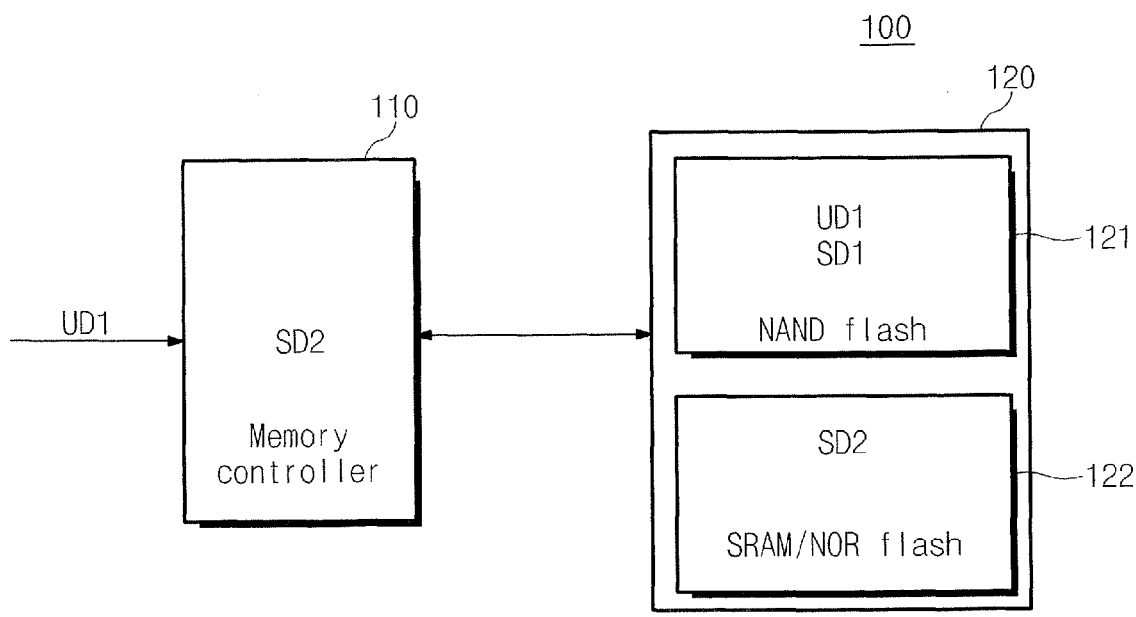
FIGS. 2A through 2C are block diagrams illustrating features of storing system data by means of an SRAM/NOR flash memory, in accordance with an embodiment of the present invention.
Figure 2B:
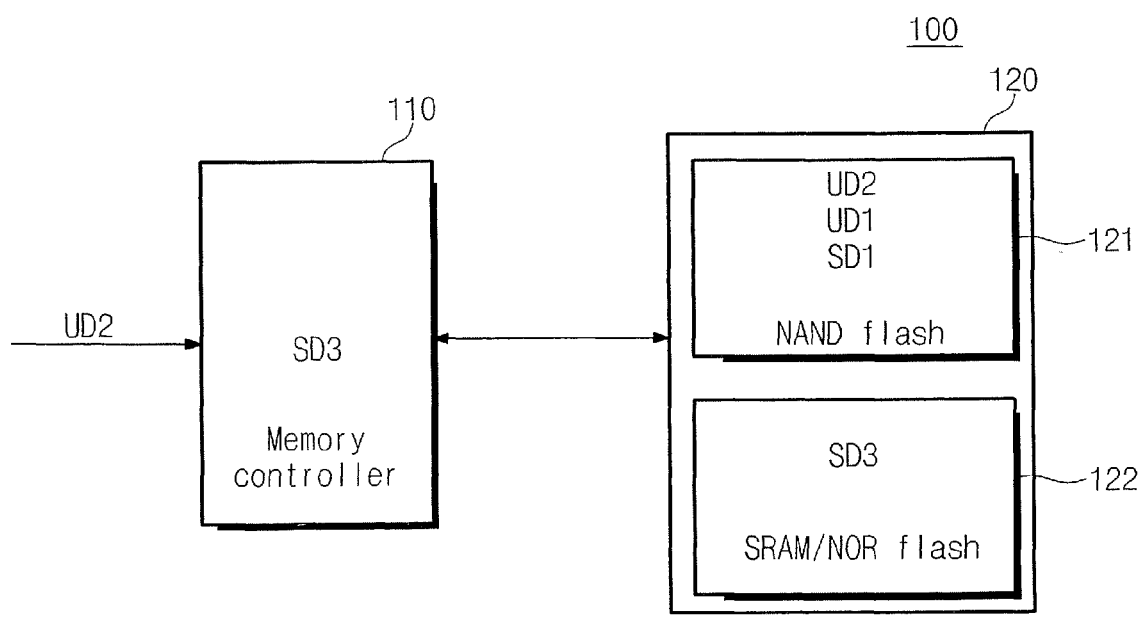
Figure 2C:
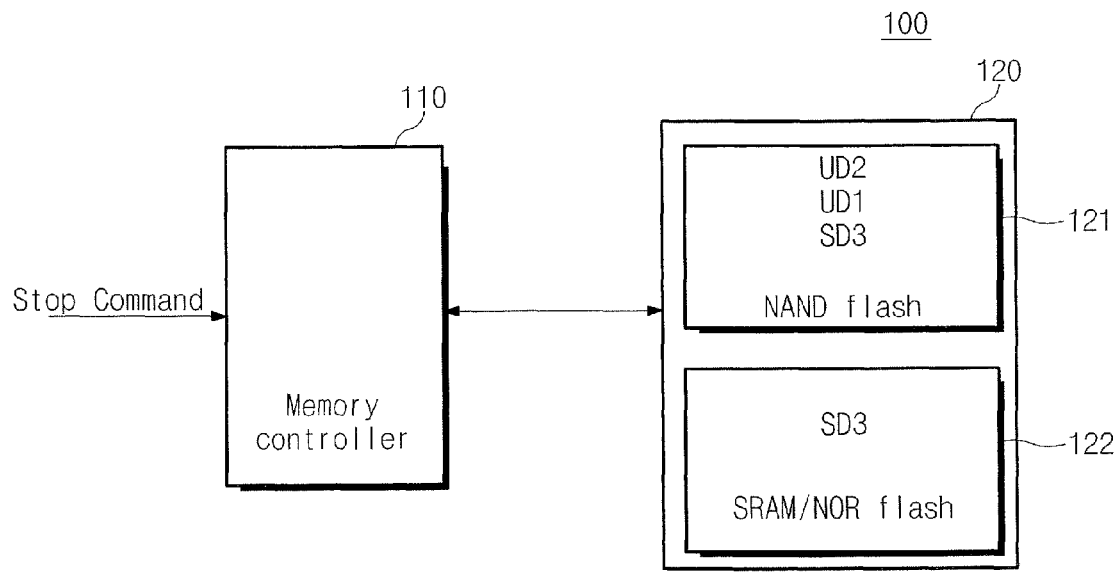

FIGS. 2A through 2C are block diagrams illustrating features of storing system data by means of the SRAM/NOR flash memory in accordance with an embodiment of the present invention. For convenience of description, the host 300 is not shown in FIGS. 2A through 2C. Referring to FIG. 2A, system data SD1 stored in the NAND flash memory 121 is information about bad blocks arising from the process thereof or system information updated while storing data therein from the host 300. System data SD2 is stored in the hidden area (not shown) of the NAND flash memory 121. The memory controller 110 inputs user data UD1 from the host 300 and stores the user data UD1 into a page of the NAND flash memory 121 in correspondence with a logical address.

The memory controller 110 reads and fetches system data SD1 from the hidden area of the NAND flash memory 121 if there is an input of the user data UD1 from the host 300. The memory controller 110 generates system data SD2 updated from the system data SD1 when the user data UD1 is stored in the NAND flash memory 121. Namely, the regenerated system data SD2 is a resultant data including the system data SD1 and system data generated while storing the user data UD1 into the NAND flash memory 121. The memory controller 110 stores the updated system data SD2 into the SRAM/NOR flash memory 122, which is faster than the NAND flash memory 121 in data storage speed.

Referring to FIG. 2B, the memory controller 110 inputs user data UD2 from the host 300 and stores the user data UD2 into a page of the NAND flash memory 121. When the user data UD2 is input from the host 300, the memory controller 110 reads the system data SD2 from the SRAM/NOR flash memory 122. The memory controller 110 generates system data SD3 updated from the system data SD2 when storing the user data UD2 into the NAND flash memory 121. Namely, the regenerated system data SD3 is a resultant data including the system data SD2 and system data generated while storing the user data UD2 into the NAND flash memory 121. The memory controller 110 stores the updated system data SD3 into the SRAM/NOR flash memory 122 that is faster than the NAND flash memory 121 in data storage speed.

Referring to FIG. 2C, the host 300 transfers a stop command to the memory card 100 after completing the transmission of the user data. As the memory controller 110 of the memory card 100 does not receive the user data, there is no update of the system data SD3. The memory controller 110 reads the system data SD3 from the SRAM/NOR flash memory 122 in response to the stop command input from the host 300. The memory controller 110 stores the system data SD3, which is read from the SRAM/NOR flash memory 122, into the NAND flash memory 121. The memory card 100 repeats the operation of updating the system data SD3 stored in the NAND flash memory 121 when inputting the user data again from the host.

As stated above, the memory card 100 stores the system data SD2 and SD3 into the SRAM/NOR flash memory 122, which is faster than the NAND flash memory 121 in data storage speed. Then, the memory card 100, after completing an input of the user data, stores the system data SD3 into the NAND flash memory 121 from the SRAM/NOR flash memory 122. Since the memory card 100 stores the intermediately generated system data SD2 into the SRAM/NOR flash memory 122, which is faster than the NAND flash memory 121 in data storage speed, it is able to reduce a time for storing the system data. This speed advantage becomes more significant as the capacity of data to be stored over multiple cycles is increased.

FIGS. 3A through 3E, FIG. 4, and FIG. 5 are block diagrams illustrating features of storing user data by means of the SRAM/NOR flash memory in accordance with an embodiment of the present invention. An operation of the memory card 100 when storing data into the NAND flash memory 121 in compliance with a single-block-write command transferred from the host when the NAND flash memory 121 of the memory card 100 is the MLC type and one page of the NAND flash memory 121 is 2 K bytes in capacity will now be described. For convenience of description, the host 300 is not shown in FIGS. 3A through 3E, FIG. 4, and FIG. 5. The host 300 transfers 512-byte user data and the single-block-write command to the memory card 100. Further, the host 300 transfers the same logical address to the memory card 100 while transferring the user data UD1, UD2, UD3, and UD4 to the memory card 100.

Figure 3A:
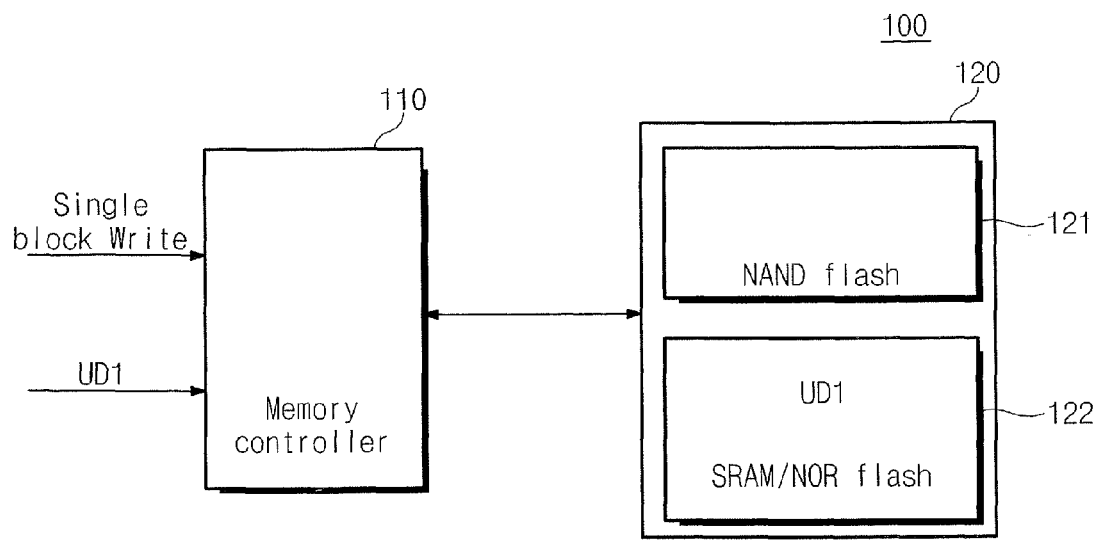
FIGS. 3A through 3E, FIG. 4, and FIG. 5 are block diagrams illustrating features of storing user data by means of the SRAM/NOR flash memory, in accordance with an embodiment of the present invention.

Referring to FIG. 3A, the host 100 transfers the 512-byte user data UD1 and the single-block-write command to the memory card 100. The memory controller 110 of the memory card 100 transfers the 512-byte user data UD1, which is first input from the host 300, to the SRAM/NOR flash memory, in response to the single-block-write command provided from the host 300.

Figure 3B:
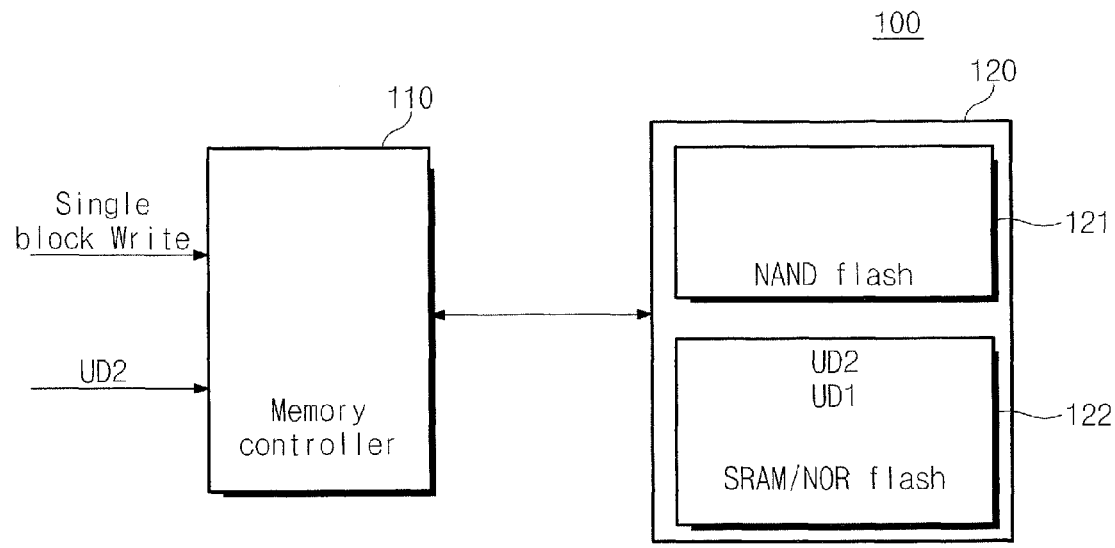

Referring to FIG. 3B, the host 100 transfers the 512-byte user data UD2 and the single-block-write command to the memory card 100. The memory controller 110 of the memory card 100 transfers the 512-byte user data UD2, which is input from the host 300, to the SRAM/NOR flash memory, in response to the single-block-write command provided from the host 300. The SRAM/NOR flash memory 122 stores user data UD1 and UD2, which totals 1024 bytes of data.

Figure 3C:
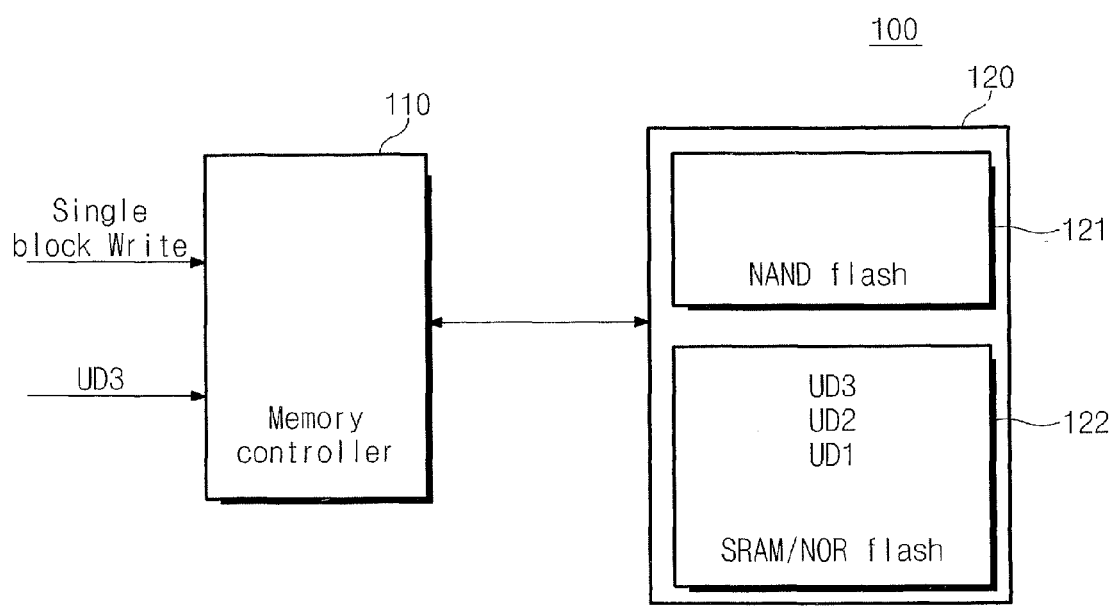

Referring to FIG. 3C, the host 100 transfers the 512-byte user data UD3 and the single-block-write command to the memory card 100. The memory controller 110 of the memory card 100 transfers the 512-byte user data UD3, which is first input from the host 300, to the SRAM/NOR flash memory, in response to the single-block-write command. During this, an area of the SRAM/NOR flash memory device 122, in which the user data UD3 is stored, is designated by the memory controller 110. The SRAM/NOR flash memory 122 stores user data UD1, UD2, and UD3, which totals 1536 bytes of data.

Figure 3D:
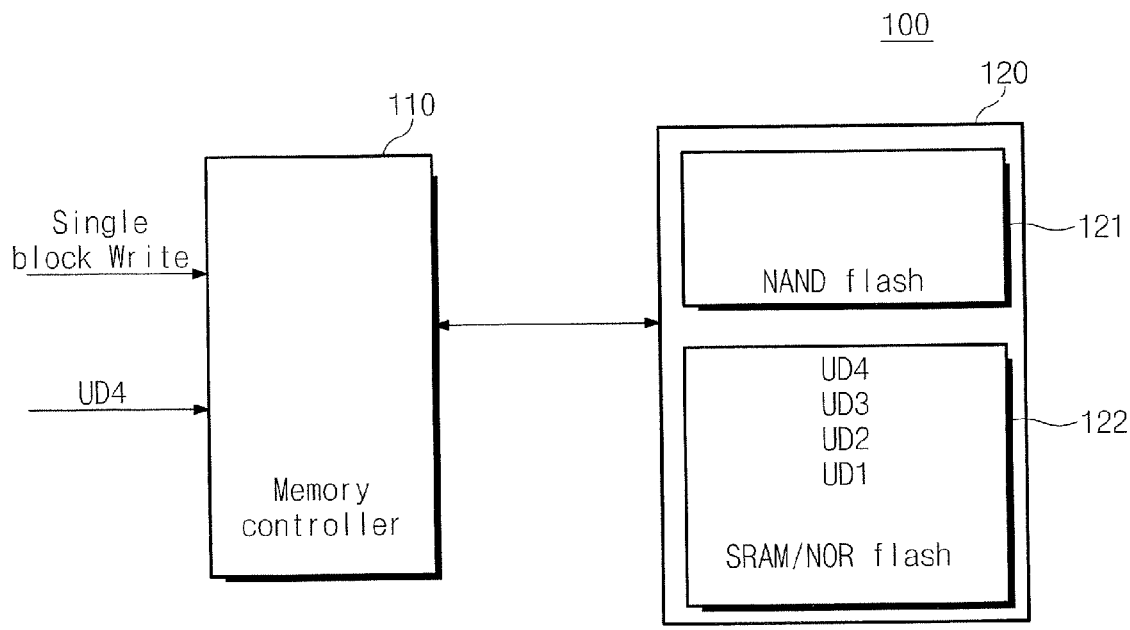

Referring to FIG. 3D, the host 100 transfers the 512-byte user data UD4 and the single-block-write command to the memory card 100. The memory controller 110 of the memory card 100 transfers the 512-byte user data UD4, which is first input from the host 300, to the SRAM/NOR flash memory, in response to the single-block-write command. The SRAM/NOR flash memory 122 stores user data UD1, UD2, UD3, and UD4, which totals 2048 bytes of data.

Figure 3E:
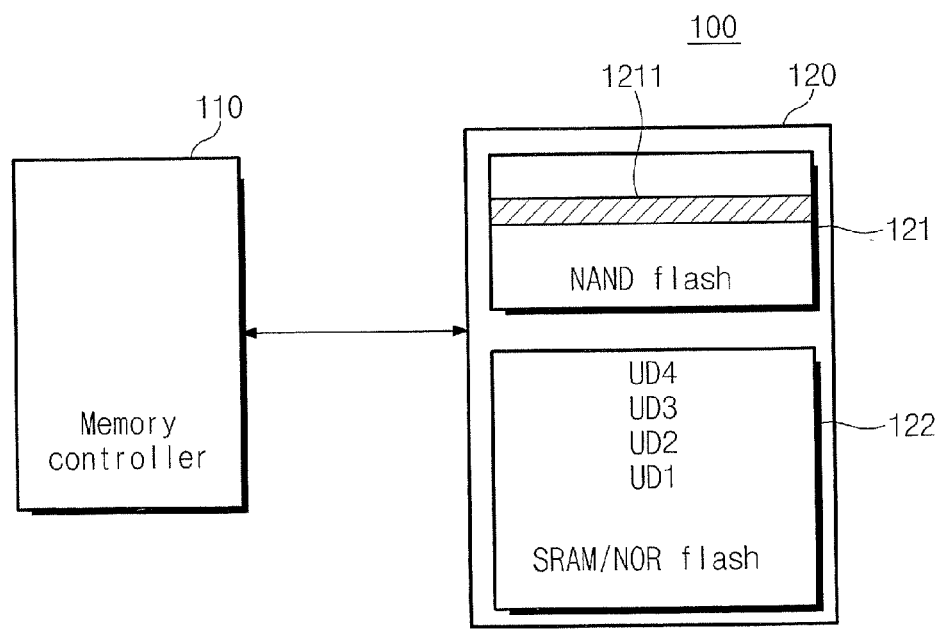

Referring to FIG. 3E, if a sum of the user data UD1, UD2, UD3, and UD4 stored in the SRAM/NOR flash memory 122 is 2 K bytes, the memory controller 110 reads the 2K-byte user data UD1~UD4 from the SRAM/NOR flash memory 122 and then stores the read user data UD1~UD4 into a page 1211 of the NAND flash memory 121. The page 1211 of the NAND flash memory 121, in which the user data UD1~UD4 is stored, is assigned with a physical address designated by conducting an address mapping operation. Thus, the memory controller 110 arranges the user data UD1~UD4, which is temporarily stored in the SRAM/NOR flash memory 122, in accordance with the capacity of one page of the MLC NAND flash memory 121.

Figure 4:
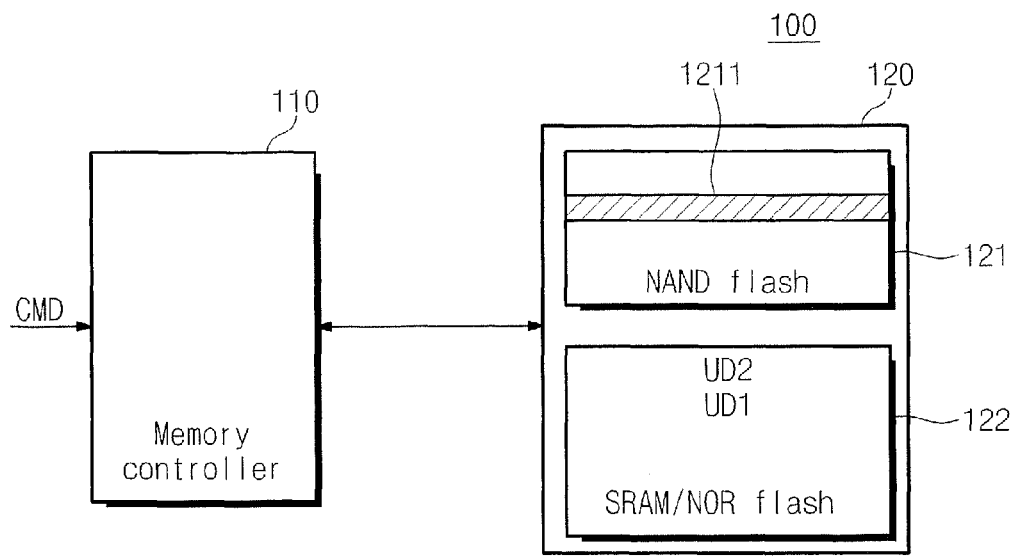
Figure 5:
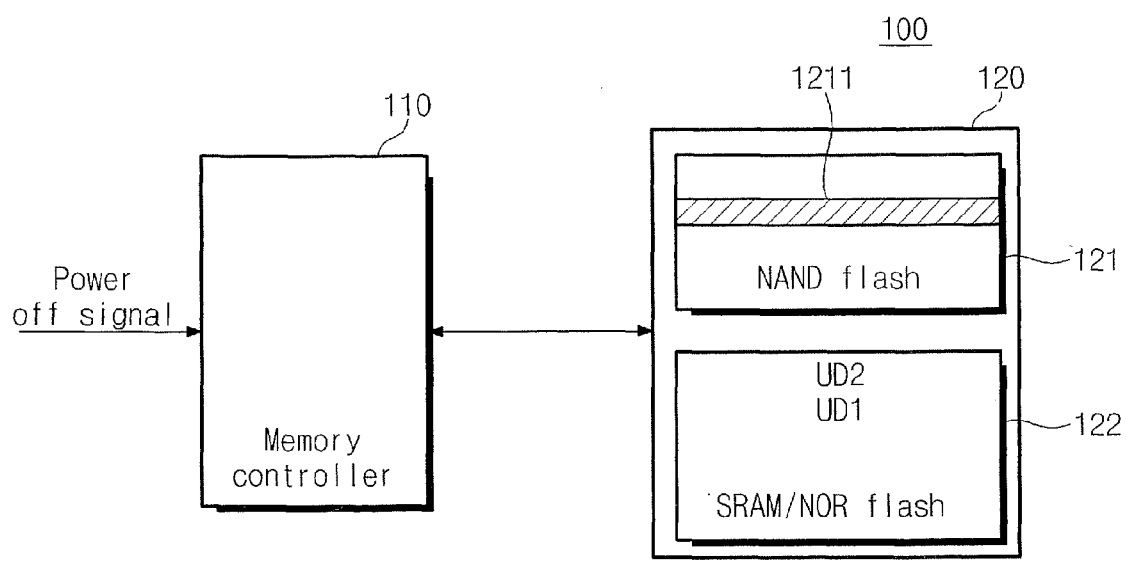

FIGS. 4 and 5 illustrate an operation of the memory card 100 if there is no more input of the single-block-write command from the host 300 into the memory card 100. When there is no more input of the single-block-write command from the host 300 into the memory card 100, the sum of the user data stored in the SRAM/NOR flash memory 122 may not be 2 K bytes. Moreover, there may be a case that the memory card 100 receives another command besides the single-block-write command from the host 300 or a power-off signal from the host 300 for terminating a systemic operation. When the memory card 100 does not receive additional single-block-write commands, the user data stored in the SRAM/NOR flash memory 122 is transferred to the MLC NAND flash memory 121 even though the user data is less than the sum of 2 K bytes.

Referring to FIGS. 4 and 5, the SRAM/NOR flash memory 122 of the memory card 100 according to the present invention stores two user data UD1 and UD2 in compliance with the single-block-write command transferred from the host 300 (see FIGS. 3A and 3C). Each of the two user data UD1 and UD2 is 512 bytes. As illustrated in FIGS. 4 and 5, the memory card 100 receives another command CMD but the single-block-write command or a power-off signal for termination of systemic operation, from the host 300. In this case, there is no more input of the signal-block-write command to the memory card 100. As the SRAM/NOR flash memory 122 stores the user data UD1 and UD2 each of which is 512 bytes, the sum of the user data UD1 and UD2 is less than the 2 K bytes. But, the memory controller 110 of the memory card 100, if there is no more input of the single-block-write command, stores the two user data UD1 and UD2 each of 512 bytes into the page 1211 of the MLC NAND flash memory 121. The page 1211 of the MLC NAND flash memory 121, storing two 512-byte user data UD1 and UD2, is assigned to a physical address designated by an address mapping operation.

The memory card 100 stores the two 512-byte user data UD1 and UD2 in the SRAM/NOR flash memory 122 with faster data storage speed. Thereafter, if there is no more input of the single-block-write command to the memory card 100, the two 512-byte user data UD1 and UD2 stored in the SRAM/NOR flash memory 122 are transferred to the page 1211 of the MLC NAND flash memory 121. Thus, it is possible to reduce a data storage time because the memory card 100 stores the two 512-byte user data UD1 and UD2 in the MLC NAND flash memory 121 after temporarily storing them into the SRAM/NOR flash memory 121, which is faster than the MLC NAND flash memory 121 in data storage speed.

Although not shown in FIGS. 4 and 5, even in the case that the SRAM/NOR flash memory 122 stores three 512-byte user data and there is no input of the single-block-write command to the memory card 100, the procedure of operation is the same as the case where the SRAM/NOR flash memory 122 stores the two 512-byte user data. Thus, it is possible to reduce a data storage time because the memory card 100 stores the three 512-byte user data in the MLC NAND flash memory 121 after temporarily storing them into the SRAM/NOR flash memory 121.

As discussed previously, when the memory card 100 includes the MLC NAND flash memory 121 and receives the single-block-write command from the host 300, the memory controller 110 of the memory card 100 temporarily stores the user data, which is input from the host 300, into the SRAM/NOR flash memory 121, which is faster than the MLC NAND flash memory 121 in data storage speed. As a result, the memory card 100 according to an embodiment of the present invention includes the SRAM/NOR flash memory 122, which has fast storage time. The reduced storage time as a whole contributes to enhancing the performance of the memory card 100.

In the drawings and specification, there have been disclosed typical preferred embodiments of the invention and, although specific terms are employed, they are used in a generic and descriptive sense only and not for purposes of limitation, the scope of the invention being set forth in the following claims

The invention claimed is:

1. An integrated circuit memory system, comprising:
   a random access memory device;
   a flash memory device;
   a memory controller configured to respond to at least one command to write data into said flash memory device by first writing the data into said random access memory device and then transferring the data from said random access memory device to said flash memory device;
   wherein said memory controller is configured to write the data into said random access memory device over multiple write cycles and transfer the data from said random access memory device to said flash memory device by generating a single page write command.

2. The memory system of claim 1, wherein said memory controller is further configured to read system data from said random access memory device and then update the system data in response to user data received by said memory controller.

3. The memory system of claim 1, wherein said memory controller is configured to transfer the data from said random access memory device to said flash memory device in response to detecting that the data written into said random access memory device constitutes a page of data relative to said flash memory device.

4. An integrated circuit memory system, comprising:
   a random access memory device;
   a flash memory device;
   a memory controller configured to respond to at least one command to write data into said flash memory device by first writing the data into said random access memory device and then transferring the data from said random access memory device to said flash memory device;

wherein the random access memory device is a NOR-type flash memory device; and wherein the flash memory device is a NAND-type flash memory device.

5. An integrated circuit memory system, comprising:
a random access memory device;
a flash memory device;
a memory controller configured to respond to at least one command to write data into said flash memory device by first writing the data into said random access memory device and then transferring the data from said random access memory device to said flash memory device;
wherein said memory controller is configured to transfer the data in response to a stop command.

6. A memory card comprising:
a random access memory;
a flash memory storing system and user data; and
a memory controller operating to control the random access memory and the flash memory,
wherein the memory controller is configured to read the system data from the flash memory, and updates and stores the system data in the random access memory in response to each input of the user data to be stored in the flash memory;
wherein the memory controller, if the input of the user data is terminated, inputs a stop command from external and stores the system data into the flash memory from the random access memory in response to the stop command.

7. The memory card as set forth in claim 6, wherein the memory controller reads the system data from the random access memory in response to each input of the user data and updates the read system data.

8. The memory card as set forth in claim 6, wherein the random access memory is one of a static random access memory and a NOR flash memory.

9. The memory card as set forth in claim 6, wherein the flash memory is a NAND flash memory.

10. A memory card comprising:
a random access memory;
a multi-level cell flash memory storing user data; and
a memory controller operating to control the random access memory and the multi-level cell flash memory,
wherein the memory controller continuously inputs a series of single-block-write commands and the user data from external, stores the user data each into the random access memory in response each to the single-block-write commands, and stores the user data into the multi-level cell flash memory from the random access memory if there is no more input of the single-block-write command.

11. The memory card as set forth in claim 10, wherein the memory controller stores the user data into the multi-level cell flash memory from the random access memory if a sum of the user data stored in the random access memory is correspondent with one page capacity of the multi-level cell flash memory.

12. The memory card as set forth in claim 10, wherein the memory controller stores the user data into the multi-level cell flash memory from the random access memory if there is an input of another command different from the single-block-write command.

13. The memory card as set forth in claim 10, wherein the memory controller stores the user data into the multi-level cell flash memory from the random access memory if there is an input of a power-off signal from the external.

14. The memory card as set forth in claim 10, wherein the user data is 512 bytes.

15. The memory card as set forth in claim 10, wherein the random access memory is one of a static random access memory and a NOR flash memory.

16. A method for storing system data in a memory card including flash and random access memories storing system and user data, the method comprising:
updating the system data in response to each input of the user data to be stored in the flash memory;
storing the updated system data into the random access memory;
inputting a stop command from external if the input of the user data is terminated; and
storing the system data into the flash memory from the random access memory in response to the stop command.

17. The method as set forth in claim 16, wherein updating the system data comprises:
reading the system data from the random access memory in response to the input of the user data; and
updating the read system data.

18. The method as set forth in claim 16, wherein the random access memory is one of a static random access memory and a NOR flash memory.

19. The method as set forth in claim 16, wherein the flash memory is a NAND flash memory.

* * * * *